US008054100B1

United States Patent
Liao et al.

(10) Patent No.: US 8,054,100 B1
(45) Date of Patent: Nov. 8, 2011

(54) LINE TRANSCEIVER APPARATUS FOR MULTIPLE TRANSMISSION STANDARDS

(75) Inventors: Ting-Ko Liao, Hsin-Chu (TW);
Tsu-Chun Liu, Hsin-Chu (TW)

(73) Assignee: IC Plus Corp., Hsin-Chu (TW)

( * ) Notice: Subject to any disclaimer, the term of this patent is extended or adjusted under 35 U.S.C. 154(b) by 0 days.

(21) Appl. No.: 12/958,410

(22) Filed: Dec. 2, 2010

(30) Foreign Application Priority Data

Sep. 29, 2010 (TW) ................................ 99133078 A (51) Int. Cl.
*H03K 17/16* (2006.01)
(52) U.S. Cl. ................................................... 326/30
(58) Field of Classification Search ............ 326/30, 326/82–87
See application file for complete search history.

(56) References Cited

U.S. PATENT DOCUMENTS

| | | | | | |
|---|---|---|---|---|---|
| 3,993,959 | A | * | 11/1976 | Boctor | 327/556 |
| 4,050,023 | A | * | 9/1977 | Edgar | 327/552 |
| 4,132,966 | A | * | 1/1979 | Hilberman | 333/217 |
| 5,317,277 | A | * | 5/1994 | Cavigelli | 330/109 |
| 6,531,902 | B1 | * | 3/2003 | Tennen et al. | 327/108 |
| 7,649,948 | B2 | * | 1/2010 | Hauptmann et al. | 375/257 |
| 2002/0119753 | A1 | * | 8/2002 | Digiandomenico et al. | 455/63 |
| 2005/0189969 | A1 | * | 9/2005 | Nicholas | 327/131 |
| 2006/0034359 | A1 | * | 2/2006 | Hauptmann et al. | 375/222 |

OTHER PUBLICATIONS

Joseph, "A 100-MHz, 50-Ω, −45-dB Distortion, 3.3-V CMOS Line Driver for Ethernet and Fast Ethernet Networking Applications" IEEE Journal of Solid-State Circuits, vol. 34, No. 8, Aug. 1999, 7pages.

* cited by examiner

*Primary Examiner* — Shawki S Ismail
*Assistant Examiner* — Thienvu Tran
(74) *Attorney, Agent, or Firm* — Jianq Chyun IP Office (57) ABSTRACT

A line transceiver apparatus for multiple transmission standards including a operational amplifier (OP-AMP), a transformer unit, a first variable resistor unit to a sixth variable resistor unit, and a variable resistor control unit is provided. The first resistor and the second resistor are coupled between transmission nodes of the line transceiver apparatus and input nodes of the OP-AMP, and the load nodes of the transformer unit are receiving nodes of the line transceiver apparatus. The variable resistor control unit adjusts the impedances of the first variable resistor unit to the sixth variable resistor unit according to a transmission standard selection signal so as to enable the line transceiver apparatus to support multiple transmission standards.

10 Claims, 6 Drawing Sheets

LINE TRANSCEIVER APPARATUS FOR MULTIPLE TRANSMISSION STANDARDS

CROSS-REFERENCE TO RELATED APPLICATION

This application claims the priority benefit of Taiwan application serial no. 99133078, filed on Sep. 29, 2010. The entirety of the above-mentioned patent application is hereby incorporated by reference herein and made a part of this specification.

BACKGROUND OF THE INVENTION

1. Field of the Invention

The disclosure is related to a line transceiver apparatus, and in particular to a line transceiver apparatus which supports multiple transmission standards.

2. Description of Related Art

Ethernet is currently the most commonly used local area network technology, and the technical standards thereof, such as the technologies related to connections between physical layers and interactions between devices and physical media in open system interconnection (OSI) reference models, have been established in the IEEE 802.3 standard by the Institute of Electrical and Electronics Engineers (IEEE). Currently, twisted pair lines are often used in Ethernet as transmission lines for a communication network, so that electromagnetic interference and crosstalk are reduced.

Since technology related to Ethernet are constantly evolving, many different transmission standards are developed. Currently, some main standards that are widely used include the 10BASE-T standard, the 100BASE-T standard (which is also termed the "Fast Ethernet" standard), and the 1000BASE-T standard (which is also termed the "Gigabit Ethernet" standard). The baseband transmission speed of the above standards are respectively 10 megabits per second (Mbit/s), 100 Mbit/s, and 1000 Mbit/s. There are also other transmission standards for special uses, such as the 10BASE-TE standard which consumes less electricity during data transmission compared to the 10BASE-T standard. "BASE" is the abbreviation for "baseband." "T" stands for the use of twisted pair lines as transmission lines. The most commonly used twisted pair lines for Ethernet nowadays is the Category 5 line, abbreviated the CAT-5 line. In the above Ethernet baseband transmission standards, the same connector is used, that is, the RJ-45 connector, and standards with higher speeds are mostly compatible with the standards with lower speeds, so that under most circumstances, network equipment adopting different standards with different speeds may be used together.

Figure 1:
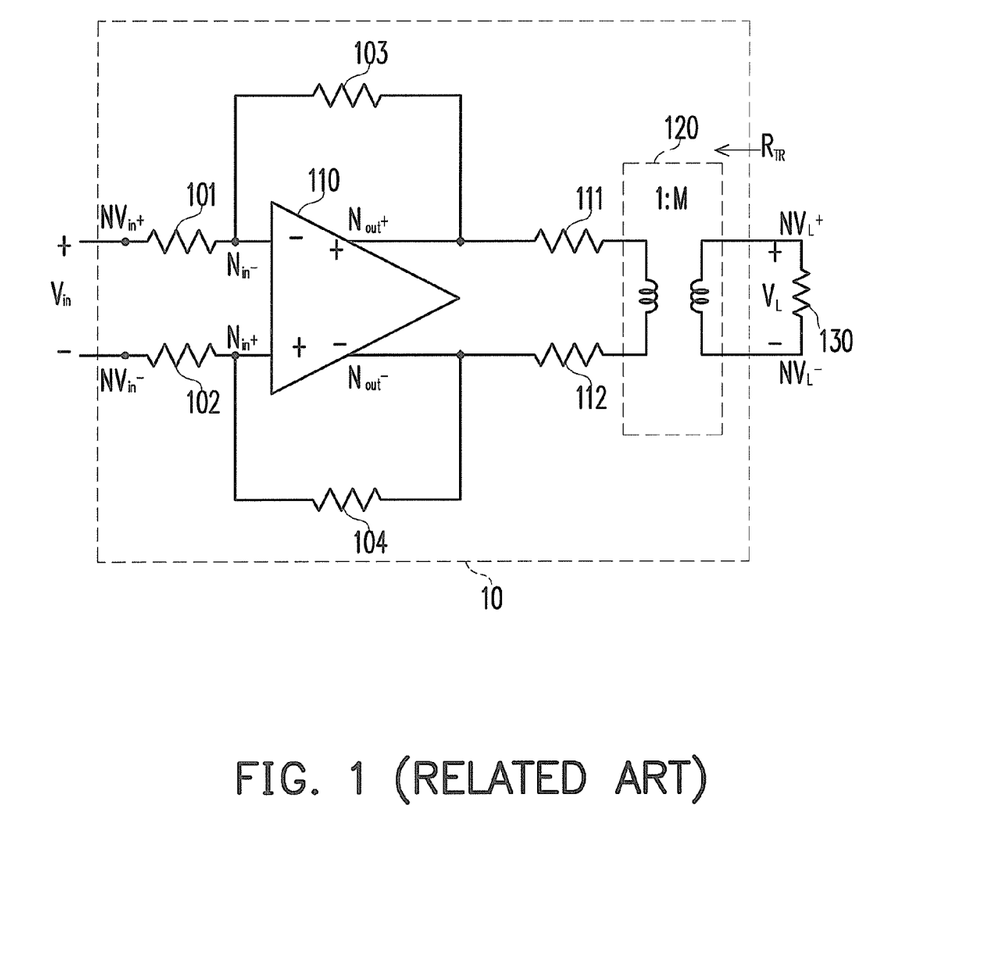
FIG. 1 is a schematic circuit structure of a conventional line transceiver apparatus which supports multiple transmission standards.

In Ethernet wired communication technology, line transceivers are used by network equipment such as network interface cards to transmit and receive signals on transmission lines. Since network interface cards are expected to be compatible with Ethernet transmission standards, such as the 10/100/1000BASE-T standards, network interface cards require line transceiver apparatuses which support multiple transmission standards. FIG. 1 is a schematic circuit structure of a conventional line transceiver apparatus 10 which supports multiple transmission standards. Please refer to FIG. 1, a transmission node (such as a network interface card or another piece of network equipment which is not shown) provides a signal $V_{in}$ to input nodes $NV_{in}+$ and $NV_{in}-$ of the line transceiver apparatus, and uses the line transceiver apparatus 10 to generate a load signal $V_L$, so as to transmit a signal through a transmission line (here the transmission line is viewed as an external load 130), or the transmission node uses the line transceiver apparatus 10 to receive the load signal $V_L$ carried by the transmission line.

The line transceiver apparatus 10 has an operational amplifier (OP-AMP) 110, resistors, 101-104, resistors 111 and 112, and a transformer unit 120 which is able to adjust a turns ratio. The resistors 101-104 are capable of controlling a transmission gain of the OP-AMP 110, wherein the resistors 101 and 102 have an impedance of R1, and the resistors 103 and 104 have an impedance of R2. Therefore, an equation (1) for calculating a transmission gain $Gain_{TX}$ is shown below:

$$Gain_{TX}=R2/R1 \quad (1)$$

In the 10BASE-T standard, a voltage amplitude of the load signal $V_L$ is about ±2.5 V, whereas in other standards, such as in the 100BASE-T standard and in the 1000BASE-T standard, the load signal $V_L$ which supports these standards clearly has a lower voltage amplitude. For example, the voltage amplitude of the load signal $V_L$ in the 100BASE-T/1000BASE-T standard is about ±1 V, and the voltage amplitude of the load signal $V_L$ in the 10BASE-TE standard is about ±1.5 V to ±1.9 V. Therefore, when the line transceiver apparatus 10 determines the transmission gain $Gain_{TX}$ according to the selected transmission standard (such as the 100BASE-T standard), the ratio of the impedance R1 to the impedance R2 is also determined, so that the line transceiver apparatus 10 is unable to transmit or receive the load signal $V_L$ under the 10BASE-T standard, and the line transceiver apparatus 10 is hence also unable to fulfill a requirement of supporting multiple transmission standards.

Therefore, in order to support other transmission standards, the line transceiver apparatus 10 uses the transformer unit 120 which is capable of adjusting a turns ratio (such as the transformer unit which has a turns ratio of 1:M, wherein M≧2.) and uses the resistors 111 and 112 to adjust the transmission gain, so that the line transceiver apparatus 10 is able to transmit and receive the load signal $V_L$ carried by the transmission line under different transmission standards. However, the transformer unit 120 which has a turns ratio of 1:M is more expensive than transformer units which have a turns ratio of 1:1, and impedance matching can hardly be achieved between an output impedance $R_{TR}$ of the line transceiver apparatus 10 (which the impedance of the of the line transceiver apparatus 10 from an external impedance $R_L$) and the external load $R_L$. Hence it is difficult to achieve the minimum reflective noise and the maximum power transfer efficiency in different transmission standards.

SUMMARY OF THE DISCLOSURE

The disclosure provides a line transceiver apparatus for multiple transmission standards, in which a transmission gain and an output impedance thereof are adjusted according to different transmission standards, so as to support multiple transmission standards and obtain the minimum reflective noise and maximum power transfer rate.

The disclosure provides a line transceiver apparatus which includes an operational amplifier (OP-AMP), a first variable resistor unit to a six variable resistor unit, and a variable resistor control unit. The OP-AMP has an inverting input node, a non-inverting input node, an inverting output node and non-inverting output node. The first variable resistor unit is coupled between the inverting input node and the non-inverting output node, and the second variable resistor unit is coupled between the non-inverting input node and the inverting output node.

A first load node and a second load node of the transformer unit are respectively a first receiving node and a second receiving node of the line transceiver apparatus. The third variable resistor unit is coupled between a first transmission node of the transformer unit and the non-inverting input node, and the fourth variable resistor unit is coupled between a second transmission node of the transformer unit and the inverting input node. The fifth variable resistor unit is coupled between the first transmission node and the non-inverting output node, and the sixth variable resistor unit is coupled between the second transmission node and the inverting output node. The variable resistor control unit is coupled to the first to sixth variable resistor units, so as to adjust impedances of the first to sixth variable resistor units according to a transmission standard selection signal.

According to an embodiment of the disclosure, the line transceiver apparatus further includes a seventh variable resistor unit and an eighth variable resistor unit. The seventh variable resistor unit is coupled between the first transmission node and the inverting output node of the line transceiver apparatus, and the eighth variable resistor unit is coupled between the second transmission node and the non-inverting output node of the line transceiver apparatus. Moreover, the variable resistor control unit adjusts the seventh variable resistor unit and the eighth variable resistor unit according to a transmission standard selection signal.

According to an embodiment of the disclosure, a turns ratio of the transformer unit is 1:1, the first variable resistor unit and the second variable resistor unit have a same impedance, the third variable resistor unit and the fourth variable resistor unit have a same impedance, the fifth variable resistor unit and the sixth variable resistor unit have a same impedance, and the seventh variable resistor unit and the eighth variable resistor unit have a same impedance.

Due to the above, the variable resistor control unit according to the embodiments of the present disclosure is able to adjust the first to eighth variable resistor units to the corresponding impedance according to the transmission standard selection signal, so as to adjust the transmission gain and the output impedance of the line transceiver apparatus, thereby enabling the transmission nodes to utilize the line transceiver apparatus to support multiple transmission standards and transmit and receive signals. Moreover, according to the present embodiment, the output impedance may be adjusted according to the transmission standard, so that the line transceiver apparatus is implemented by using a transformer unit which has a 1:1 turns ratio, thereby reducing costs.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The following refers to the exemplary embodiments in detail and illustrates implementations of the exemplary embodiments in the accompanying drawings. In addition, whenever possible, the same reference numerals in the figures and embodiments represent same or similar elements.

Figure 2A:
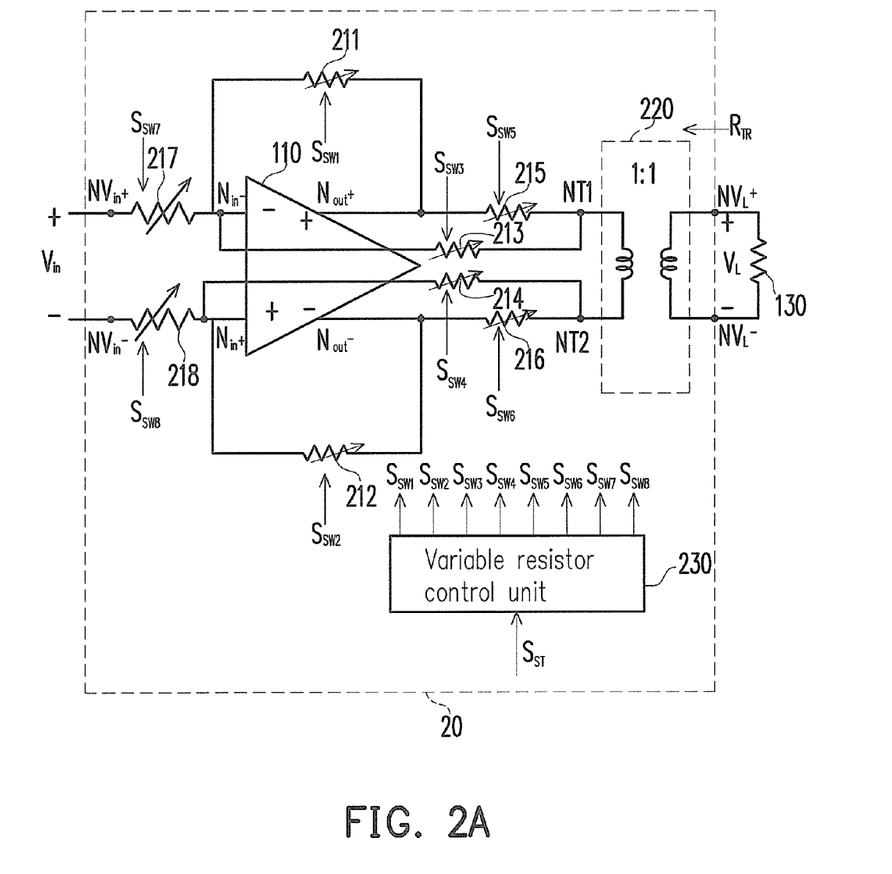
FIG. 2A is a schematic circuit structure of a line transceiver apparatus which supports multiple transmission standards according to the first embodiment of the disclosure.

Please refer to FIG. 2A, which is a schematic circuit structure of a line transceiver apparatus 20 which supports multiple transmission standards according to the first embodiment of the disclosure. As shown in FIG. 2A, the line transceiver apparatus 20 includes an OP-AMP 110, variable resistor units 211-218, a transformer unit 220, and a variable resistor control unit 230. The OP-AMP 110 has an inverting input node $N_{in}-$, a non-inverting input node $N_{in}+$, an inverting output node $N_{out}-$, and non-inverting output node $N_{out}+$. The variable resistor unit 217 is coupled between a transmission node $NV_{in}+$ of the line transceiver apparatus 20 and the inverting input node $N_{in}-$ of the OP-AMP 110, and the variable resistor unit 218 is coupled between a transmission node $NV_{in}-$ of the line transceiver apparatus 20 and the non-inverting input node $N_{in}+$ of the OP-AMP 110. The transmission node $NV_{in}+$ and the transmission node $NV_{in}-$ of the line transceiver apparatus 20 are used to receive a signal $V_{in}$. It should particularly noted that the variable resistor units 217 and 218 according to the present embodiment are both variable resistors, but according to another embodiment of the disclosure, fixed resistors may be used to replace the variable resistor units 217 and 218.

Still referring to FIG. 2A, the variable resistor unit 211 is coupled between the inverting input node $N_{in}-$ and the non-inverting output node $N_{out}+$ of the OP-AMP 110, and the variable resistor unit 212 is coupled between the non-inverting input node $N_{in}+$ and the inverting output node $N_{out}-$ of the OP-AMP 110. Load nodes $NV_L+$ and $NV_L-$ of the transformer unit 220 are respectively receiving nodes $NV_L+$ and $NV_L-$ of the line transceiver apparatus 20, and the line transceiver apparatus 20 is coupled to an external load 130 through the load nodes $NV_L+$ and $NV_L-$ of the transformer unit 220, so as to receive a negative load signal $V_L$. Additionally, it should be noted that a turns ratio of the transformer unit 220 according to the present embodiment is fixed to 1:1.

The variable resistor unit 213 is coupled between a transmission node NT1 of the transformer unit 220 and the inverting input node $N_{in}-$ of the OP-AMP 110, and the variable resistor unit 214 is coupled between a transmission node NT2 of the transformer unit 220 and the non-inverting input node $N_{in}+$ of the OP-AMP 110 . . . . According to another embodiment, the transmission node is capable of detecting the transmission standard adopted by the transmission line (external load 130) automatically, so as to automatically adjust the transmission standard selection signal SST. Therefore, a method which is capable of generating the transmission standard selection signal SST and compliant with the embodiments of the disclosure should not be limited to the above implementation.

Therefore, the variable resistor control unit 230 of the line transceiver apparatus 20 is able to adjust the variable resistor units 211-218 to the corresponding impedances according to the transmission standard selection signal $S_{ST}$, so as to adjust a transmission gain $Gain_{TX}$ and an output impedance $R_{TR}$ of the line transceiver apparatus 20, thereby enabling the line transceiver apparatus 20 to support multiple transmission standards. According to another embodiment, the variable resistor units 217 and 218 may be configured as having a fixed impedance, and the impedances of the variable resistor units 211-218 are adjusted, so as to adjust the transmission gain $Gain_{TX}$ and the output impedance $R_{TR}$.

Figure 2B:
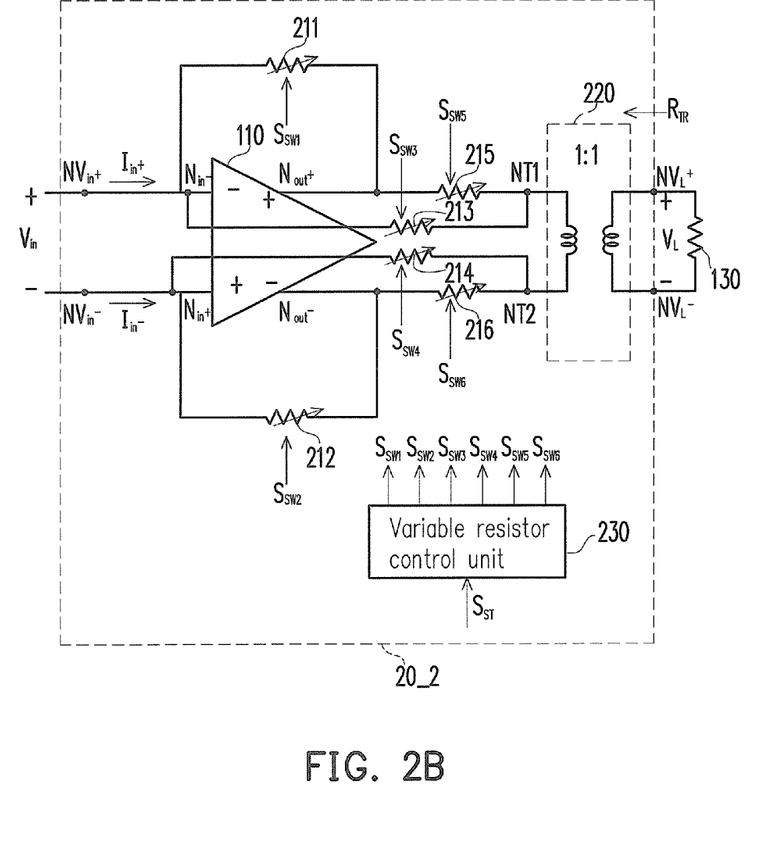
FIG. 2B is a schematic circuit structure of a line transceiver apparatus which supports multiple transmission standards according to the second embodiment of the disclosure.

In addition, FIG. 2B is a schematic circuit structure of a line transceiver apparatus 20_2 which supports multiple transmission standards according to the second embodiment of the disclosure. A difference between the present embodiment and the first embodiment is that the inverting input node $N_{in}-$ and the non-inverting input node $N_{in}+$ of the OP-AMP 110 of the line transceiver apparatus 20_2 are directly coupled to to the transmission node $NV_{in}+$ and the transmission node $NV_{in}-$, so as to respectively receive the input currents $I_{in}+$ and $I_{in}-$. In other words, the line transceiver apparatus 20_2 does not include the seventh variable resistor unit 217 and the eighth variable resistor unit 218. Other elements in line transceiver apparatus 20_2 are the same as those in the line transceiver apparatus 20 in FIG. 2A and are hence not repeatedly described.

In order to enable one of ordinary skill in the art to further comprehend the disclosure, methods of calculating the transmission voltage gain $VGain_{TX}$, a transmission impedance (transimpedance) gain $ZGain_{TX}$, and the output impedance $R_{TR}$ of the line transceiver apparatus 20 and the line transceiver apparatus 20_2 are described in detail in the following. Please refer to FIGS. 2A and 2B. Since Ethernet signals are transmitted as differential type signals, meaning that voltage amplitudes of the signal $V_{in}$ received by the transmission nodes $NV_{in}+$ and $NV_{in}-$ are symmetric, resistors and currents at corresponding positions in the line transceiver apparatus 20 and the line transceiver apparatus 20_2 should have the same impedance and same current value. In detail, according to the present embodiment, impedances of the variable resistor units 217 and 218 are R1, impedances of the variable resistor units 211 and 212 are R3, impedances of the variable resistor units 213 and 214 are R4, impedances of the variable resistor units 215 and 216 are $R_S$, and current values of the input currents $I_{in}+$ and $I_{in}-$ are $I_{in}$, so that the present embodiment may be described in simplicity.

According to circuit calculation methods, an equation (2) for calculating the transmission voltage gain VGainTX of the line transceiver apparatus 20 in FIG. 2A is shown below:

$$VGain_{TX} = \frac{(R4 \times R3)}{(R4 - R3) \times R1} \quad (2)$$

An equation (3) for calculating the transmission impedance gain $ZGain_{TX}$ of the line transceiver apparatus 20_2 in FIG. 2B is shown below:

$$ZGain_{TX} = \frac{(R4 \times R3)}{(R4 - R3)} \quad (3)$$

It is known from equations (2) and (3) that by adjusting the impedance R1 of the variable resistor units 217 and 218, the impedance R3 of the variable resistor units 211 and 212, and the impedance R4 of the variable resistor units 213 and 214, the variable resistor control unit 230 in FIG. 2A adjusts the transmission voltage gain $VGain_{TX}$ of the line transceiver apparatus 20. By adjusting the impedance R3 and R4 of the variable resistor units 211 and 212, the variable resistor control unit 230 in FIG. 2B adjusts the transmission impedance gain $ZGain_{TX}$ of the line transceiver apparatus 20_2.

Additionally, according to circuit calculation methods, an equation (4) for calculating the output impedance RTR for the transmission line (external load 130) of both the line transceiver apparatus 20 and the line transceiver apparatus 20_2 is shown below:

$$R_{TR} = R_S \times \frac{R4}{R4 - R3} \quad (4)$$

Therefore, the variable resistor control unit 230 is capable of altering the impedance R3 of the variable resistor units 211 and 212, the impedance R4 of the variable resistor units 213 and 214, and the impedance RS of the variable resistor units 213 and 214, so as to adjust the output impedance RTR of the line transceiver apparatus 20 and the line transceiver apparatus 20_2. The output impedance RTR is thereby matched with the external load 130 of the transmission line, so that when multiple transmission standards are supported, the minimum reflective noise and the optimal power transfer efficiency are achieved. Additionally, the variable resistor control unit 230 in FIGS. 2A and 2B adjusts the transmission voltage gain VGainTX, the transmission impedance (transimpedance) gain RGainTX, and the output impedance RTR by changing the impedances of the variable resistor units 211-218, so that more expensive transformer units which have different turns ratios are not required. Instead, the transformer unit 220 which has a 1:1 turns ratio is adopted to lower costs.

FIG. 2A is used to describe an implementation of the line transceiver apparatus 20 which supports multiple actual transmission standards, so that one of ordinary skill in the art further understands the present disclosure. The line transceiver apparatus 20 according to the present embodiment supports the 100/1000BASE-T standards. Assuming that a load signal $V_L$ which complies with the 100/1000BASE-T standards has a voltage amplitude of about ±1 V, and an external load $R_L$ of the transmission line is 100 ohms (Ω), the impedance R1 of the variable resistor units 217 and 218 is configured to be equal to 150Ω. Therefore, when the transmission standard selection signal $S_{ST}$ includes information about the 100/100BASE-T standards, the variable resistor control unit 230 adjusts the impedance R1 of the variable resistor units 211 and 212 to be equal to 300Ω, adjusts the impedance R3 of the variable resistor units 213 and 214 to be infinitely large (meaning that the variable resistor units 213 and 214 become open circuits), and adjusts the impedance $R_S$ of the variable resistor units 216 and 216 to be equal to 50Ω according to the transmission standard selection signal $S_{ST}$, so that the transmission gain $Gain_{TX}$ and the output impedance $R_{TR}$ are as shown in equations (5) and (6), thereby achieving the minimum reflective noise and the optimal power transfer efficiency under the 100/100BASE-T transmission standards.

$$VGain_{TX} = \frac{(R4 \times R3)}{(R4 - R3) \times R1} = \frac{R3}{R1} = \frac{300}{150} = 2 \quad (5)$$

$$R_{TR} = R_S \times \frac{R4}{R4 - R3} = R_S \times 1 = 50(\Omega) \qquad (6)$$

Furthermore, the line transceiver apparatus 20 is able to support the 10BASE-TE standard. The load signal $V_L$ which complies with the 10BASE-TE standard has a voltage amplitude of about ±1.67V (the load signal $V_L$ which complies with the 10BASE-TE standard has a voltage amplitude from ±1.5 to ±1.9V), and the external load $R_L$ and the impedance R1 of the variable resistor units 217 and 218 are the same as those described in the above embodiment. When the transmission standard selection signal $S_{ST}$ includes information about the 10BASE-TE standard, the variable resistor control unit 230 adjusts the impedances R3, R4, and $R_S$ of the variable resistor units 211-216 to respectively be 150, 300, and 25Ω according to the transmission standard selection signal $S_{ST}$, so that the transmission gain $Gain_{TX}$ and the output impedance $R_{TR}$ of the line transceiver apparatus 20 are as shown by equations (7) and (8). The line transceiver apparatus 20 is hence able to support the 10BASE-TE transmission standard.

$$VGain_{TX} = \frac{(R4 \times R3)}{(R4 - R3) \times R1} = \frac{300 \times 150}{(300 - 150) \times 150} = 2 \qquad (7)$$

$$R_{TR} = R_S \times \frac{R4}{R4 - R3} = R_S \times 2 = 25 \times 2 = 50(\Omega) \qquad (8)$$

As the line transceiver apparatus 20 is able to support the 10BASE-T standard, the load signal $V_L$ which complies with the 10BASE-T standard has a voltage amplitude of about ±2 V, and the external load $R_L$ and the impedance R1 of the variable resistor units 217 and 218 are the same as those described in the above embodiment. Hence when the transmission standard selection signal $S_{ST}$ includes information about the 10BASE-T standard, the variable resistor control unit 230 adjusts the impedances R3, R4, and $R_S$ of the variable resistor units 211-216 to respectively be 300, 600, and 12.5Ω according to the transmission standard selection signal $S_{ST}$, so that the transmission gain $Gain_{TX}$ and the output impedance $R_{TR}$ of the line transceiver apparatus 20 are as shown by equations (9) and (10). The line transceiver apparatus 20 is hence able to support the 10BASE-T transmission standard.

$$Gain_{TX} = \frac{(R4 \times R3)}{(R4 - R3) \times R1} = \frac{600 \times 300}{(600 - 300) \times 150} = 4 \qquad (9)$$

$$R_{TR} = R_S \times \frac{R4}{R4 - R3} = R_S \times 4 = 12.5 \times 4 = 50(\Omega) \qquad (10)$$

Equally, if the voltage amplitude of the load signal $V_L$ which complies with the 10BASE-T standard is about ±2.22 V, and the external load $R_L$ and the impedance of the variable resistor units 217 and 218 are the same as those described in the above embodiment, and when the transmission standard selection signal $S_{ST}$ includes information about the 10BASE-T standard, the variable resistor control unit 230 adjusts the impedance R3, R4, and $R_S$ of the variable resistor units 211-216 to respectively be 600, 1200, and 6.25Ω according to the transmission standard selection signal $S_{ST}$, so that the transmission gain $Gain_{TX}$ and the output impedance $R_{TR}$ of the line transceiver apparatus 20 are as shown by equations (11) and (12). The line transceiver apparatus 20 is hence able to support the 10BASE-T transmission standard.

$$VGain_{TX} = \frac{(R4 \times R3)}{(R4 - R3) \times R1} = \frac{1200 \times 600}{(1200 - 600) \times 150} = 8 \qquad (11)$$

$$R_{TR} = R_S \times \frac{R4}{R4 - R3} = R_S \times 8 = 6.25 \times 8 = 50(\Omega) \qquad (12)$$

Figure 3:
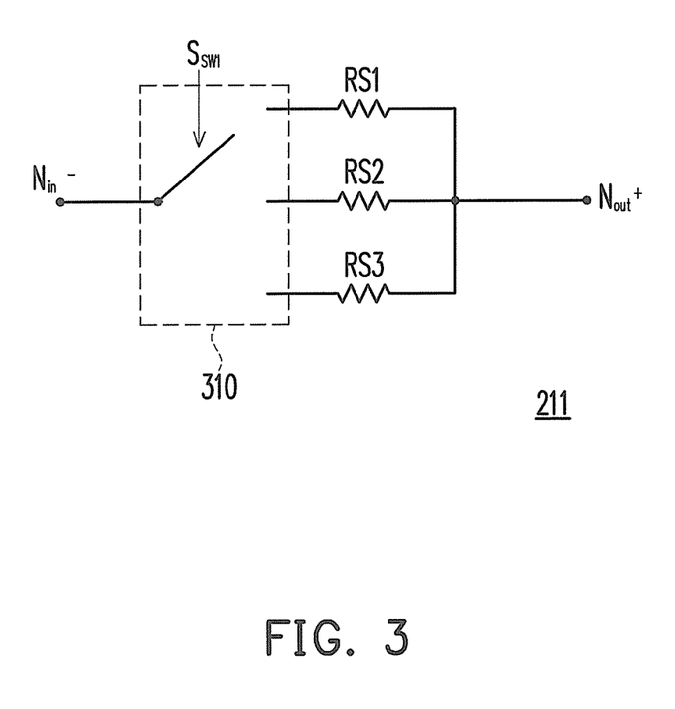
FIG. 3 is a schematic circuit structure of a variable resistor unit according to an embodiment of the disclosure.

On the other hand, the variable resistor units 211-218 which comply with the present embodiment may be implemented by a plurality of methods. The following describes three implementations; however, the variable resistor units 211-218 of the present embodiment are not limited to these implementations. The following uses the variable resistor unit 211 as an example. Please refer to FIG. 3, which is a schematic circuit structure of the variable resistor unit 211 according to an embodiment of the disclosure. As shown in FIG. 3, the variable resistor unit 211 includes a plurality of transmission standard resistors RS1-RS3. A first node of each of the transmission standard resistors RS1-RS3 is coupled to a first node of the variable resistor unit 211. The first node of the variable resistor unit 211 is, for example, a node through which the variable resistor unit 211 is coupled to the non-inverting output node $N_{out}+$ the OP-AMP 110. A first node of the switch 310 is coupled to a second node of the variable resistor unit 211, and the second node of the variable resistor unit 211 is, for example, a node through which the variable resistor unit 211 is coupled to the inverting input node $N_{in}-$ the OP-AMP 110. The switch 310 connects the second node of one of the transmission standard resistors RS1-RS3 to the second node of the variable resistor unit 211 according to the switch control signal $S_{SW1}$, so that the impedance R3 of the variable resistor unit 211 is adjusted to an impedance of one of the transmission standard resistor RS1-RS3 which is selected.

Figure 4:
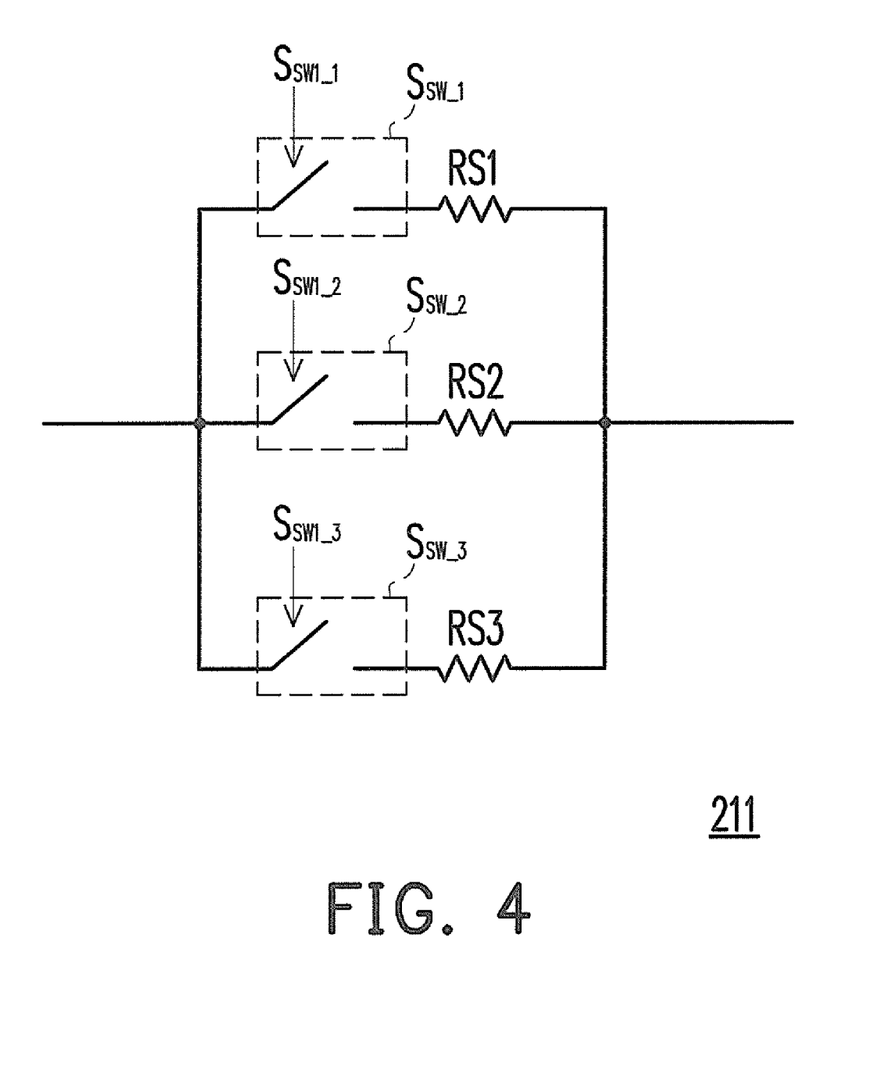
FIG. 4 is a schematic circuit structure of another variable resistor unit according to an embodiment of the disclosure.

Please refer to FIG. 4, which is a schematic circuit structure of another variable resistor unit 211 according to an embodiment of the disclosure. As shown in FIG. 4, the variable resistor unit 211 includes N transmission standard resistors RS1-RSN, wherein N is a positive integer. According to the present embodiment, N is 3. The first node of each of the transmission standard resistors RS1-RS3 is coupled to the first node of the variable resistor unit 211. Moreover, a first node of a first switch SW_1 is coupled to the second node of the variable resistor unit 211, and a second node of the first switch SW_1 is coupled to a second node of a first transmission standard resistor RS1. The nodes of the remaining switches and transmission standard resistors are coupled in a similar manner. A first node of the $i^{th}$ switch SW_i is coupled to the second node of the variable resistor unit 211, and a second node of the $i^{th}$ switch SW_i is coupled to a second node of the $i^{th}$ transmission standard resistor RSi, wherein i is a positive integer, and 1≦i≦N. Therefore, each of the switches SW_i is able to connect a second node of the $i^{th}$ transmission standard resistor RSi to the second node of the variable resistor unit 211 according to a different switch control signal $S_{SW1\_i}$, so that the variable resistor unit 211 is able to change the impedance R3 according to the switch control signal $S_{SW1\_i}$.

For example, if the first switch SW_1 and a second switch SW_2 in FIG. 4 are turned on, whereas a third switch SW_3 is turned off, the impedance R3 of the variable resistor unit 211 is adjusted to an impedance of the transmission standard resistor RS1 and the transmission standard resistor RS2 connected in parallel.

Figure 5:
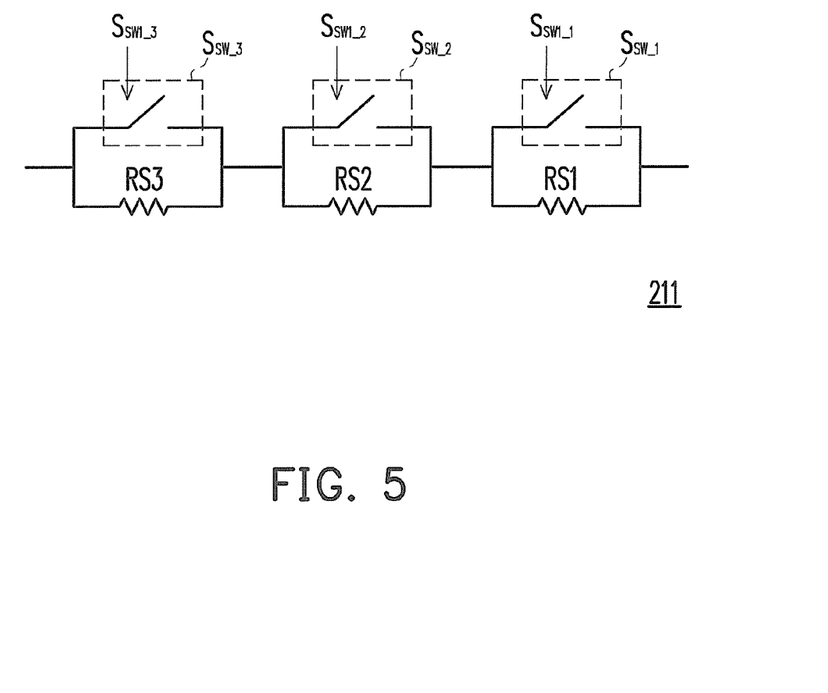
FIG. 5 is a schematic circuit structure of still another variable resistor unit according to an embodiment of the disclosure.

In addition, please refer to FIG. 5, which is a schematic circuit structure of still another variable resistor unit 211 according to an embodiment of the disclosure. As shown in FIG. 5, the variable resistor unit 211 includes N transmission standard resistors RS1-RSN and N switches SW_1-SW_N, wherein N is equal to 3 according to the present embodiment. The first node of the first transmission standard resistor RS1 is coupled to the first node of the variable resistor unit 211, and the first node of the second transmission standard resistor RS2 is coupled to the second node of the first transmission standard resistor RS1. The nodes of the remaining transmission standard resistors are coupled in a similar manner. A first node of the i+1$^{th}$ transmission standard resistor is coupled to a second node of the i$^{th}$ transmission standard resistor, and a second node of the third transmission standard resistor is coupled to a second node of the variable resistor unit 211.

Still referring to FIG. 5, the first and second nodes of the first switch SW_1 are respectively coupled to the first and second nodes of the first transmission standard resistor RS1. The nodes of the remaining switches and transmission standard resistors are coupled in a similar manner. First and second nodes of the i$^{th}$ switch SW_i are respectively coupled to first and second nodes of the i$^{th}$ transmission standard resistor RSi. The i$^{th}$ switch SW_i connects the first and second nodes of the transmission standard resistor RSi according to the i$^{th}$ switch control signal $S_{SW1\_i}$. For example, if the first switch SW_1 and the second switch SW_2 in FIG. 5 are turned off, whereas the third switch SW_3 is turned on, the impedance R3 of the variable resistor unit 211 is adjusted to an impedance of the transmission standard resistor RS1 and the transmission standard resistor RS2 connected in serial.

In summary, the variable resistor control unit according to the embodiments of the present disclosure is able to adjust the variable resistor units to the corresponding impedances according to the transmission standard selection signal, so as to adjust the gain and the output impedance of the line transceiver apparatus, thereby enabling the transmission node to utilize the line transceiver apparatus to support multiple transmission standards and transmit and receive signals. Moreover, according to the present embodiment, the output impedance may be adjusted according to the transmission standard, so that the line transceiver apparatus is implemented by using a transformer unit which has a 1:1 turns ratio, thereby reducing costs.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A line transceiver apparatus for multiple transmission standards, comprising:
   an operational amplifier, having an inverting input node, a non-inverting input node, an inverting output node, and a non-inverting output node;
   a first variable resistor unit and a second variable resistor unit, wherein the first variable resistor unit is coupled between the inverting input node and the non-inverting output node, and the second variable resistor unit is coupled between the non-inverting intput node and the inverting output node;
   a transformer unit, wherein a first load node and a second load node of the transformer unit are respectively a first receiving node and a second receiving node of the line transceiver apparatus;
   a third variable resistor unit and a fourth variable resistor unit, wherein the third variable resistor unit is coupled between a first transmission node of the transformer unit and the inverting input node, and the fourth variable resistor unit is coupled between a second transmission node of the transformer unit and the non-inverting input node;
   a fifth variable resistor unit and a sixth variable resistor unit, wherein the fifth variable resistor unit is coupled between the first transmission node and the non-inverting output node, and the sixth variable resistor unit is coupled between the second transmission node and the inverting output node; and
   a variable resistor control unit, coupled to the first to sixth variable resistor units, so as to adjust the first to sixth variable resistor units according to a transmission standard selection signal.

2. The line transceiver apparatus as claimed in claim 1, further comprising:
   a seventh variable resistor unit and an eighth variable resistor unit, wherein the variable resistor unit is coupled between the first transmission node and the inverting output node of the line transceiver apparatus, the eighth variable resistor unit is coupled between the second transmission node and the non-inverting output node of the line transceiver apparatus, and the variable resistor control unit adjusts the seventh variable resistor unit and the eighth variable resistor unit according to the transmission standard selection signal.

3. The line transceiver apparatus as claimed in claim 2, wherein the first variable resistor unit and the second variable resistor unit have a same impedance, the third variable resistor unit and the fourth variable resistor unit have a same impedance, the fifth variable resistor unit and the sixth variable resistor unit have a same impedance, and the seventh variable resistor unit and the eighth variable resistor unit have a same impedance.

4. The line transceiver apparatus as claimed in claim 3, wherein a transmission gain of the line transceiver apparatus equals a first value divided by a second value, the first value being equal to the impedance of the first variable resistor unit multiplied by the impedance of the third variable resistor unit, the second value being equal to the difference between the impedance of the third variable resistor unit and the first variable resistor unit multiplied by the impedance of the first variable resistor unit.

5. The line transceiver apparatus as claimed in claim 1, wherein the variable resistor control unit generates at least one switch control signal according to the transmission standard selection signal, and the variable resistor control unit uses the switch control signal to adjust impedances of the first variable resistor unit to the sixth variable resistor unit.

6. The line transceiver apparatus as claimed in claim 5, wherein each of the variable resistor units comprises:
   a plurality of transmission standard resistors, wherein each of the transmission standard resistors is coupled to a first node of the variable resistor unit; and
   a switch, wherein a first node of the switch is coupled to a second node of the variable resistor unit, and the switch connects the second node of one of the transmission standard resistors to the second node of the variable resistor unit according to the switch control signal.

7. The line transceiver apparatus as claimed in claim 5, wherein each of the variable resistor units comprises:
   N transmission standard resistors, wherein each of the transmission standard resistors is coupled to a first node of the variable resistor unit, and N is a positive integer;
   N switches, wherein a first node of an ith switch is coupled to a second node of the variable resistor unit, a second node of the ith switch is coupled to a second node of the ith transmission resistor, and the ith switch connects the second node of the ith transmission standard resistor to the second node of the variable resistor unit according to an ith switching signal, i being a positive integer, and $1 \leq i \leq N$.

8. The line transceiver apparatus as claimed in claim 5, wherein each of the variable resistor units comprises:

N transmission standard resistors, wherein a first node of the first transmission standard resistor is coupled to a first node of the variable resistor unit, a first node of the i+1th transmission standard resistor is coupled to a second node of an ith transmission standard resistor, and a second node of an Nth transmission standard resistor is coupled to a second node of the variable resistor unit, N and i each being a positive integer, and $1 \leq i \leq N$; and N switches, wherein a first node of an ith switch is coupled to the first node of the ith transmission standard resistor, a second node of the ith switch is coupled to the second node of the ith transmission standard resistor, and the ith switch connects the first node and the second node of the ith transmission standard resistor according to an ith switch control signal.

9. The line transceiver apparatus as claimed in claim 1, wherein a turns ratio of the transformer unit is 1:1.

10. The line transceiver apparatus as claimed in claim 1, wherein a transimpedance gain of the line transceiver apparatus is the impedance of the first variable resistor unit.

* * * * *